(12) United States Patent
Kim et al.

(10) Patent No.: US 10,324,342 B2
(45) Date of Patent: Jun. 18, 2019

(54) DRIVER OF DISPLAY DEVICE AND MANUFACTURING METHOD OF THE SAME

(71) Applicant: SAMSUNG DISPLAY CO., LTD., Yongin-si, Gyeonggi-do (KR)

(72) Inventors: Kyungho Kim, Seongnam-si (KR); Seongyoung Lee, Hwaseong-si (KR); Nahyeon Cha, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 92 days.

(21) Appl. No.: 15/592,281

(22) Filed: May 11, 2017

(65) Prior Publication Data

US 2017/0357114 A1    Dec. 14, 2017

(30) Foreign Application Priority Data

Jun. 8, 2016    (KR) .................. 10-2016-0071034

(51) Int. Cl.
*G02F 1/1345*    (2006.01)
*G02F 1/1335*    (2006.01)
(Continued)

(52) U.S. Cl.
CPC .......... *G02F 1/1345* (2013.01); *G02F 1/1368* (2013.01); *G02F 1/13394* (2013.01);
(Continued)

(58) Field of Classification Search
CPC .......... G02F 1/133512; G02F 1/13394; G02F 1/13439; G02F 1/1345; G02F 1/136286; G02F 1/1368; G02F 2001/13396; G02F 2001/13398; G02F 2001/136222; G02F 2201/123; G02F 2201/50;
(Continued)

(56) References Cited

U.S. PATENT DOCUMENTS 5,581,382 A    12/1996 Kim
8,269,413 B2    9/2012 Han et al.
(Continued)

FOREIGN PATENT DOCUMENTS

| KR | 9519817 A | 7/1995 |
| KR | 1020060082910 A | 7/2006 |
| KR | 1020080010783 A | 1/2008 |
| KR | 1020090002712 A | 1/2009 |

*Primary Examiner* — Tony O Davis
(74) *Attorney, Agent, or Firm* — Cantor Colburn LLP (57) ABSTRACT

A display device includes: a display substrate including a display area and a non-display area adjacent to each other; and an opposing substrate opposing the display substrate. The display substrate includes: a pixel in the display area; a gate driver at the non-display area and including a gate and data wiring; an organic layer on the gate and data wiring; a column spacer on the organic layer; a connection portion connected to the gate and data wiring at contact holes respectively exposing the gate and data wiring; and a protective layer on the connection portion. In a top plan view, the protective layer has a same shape as a shape of the connection portion. The opposing substrate includes a black matrix at the display area to define a pixel area of the pixel and at the non-display area to define the display area and the non-display area.

17 Claims, 6 Drawing Sheets

(51) Int. Cl.
*G02F 1/1339* (2006.01)
*G02F 1/1343* (2006.01)
*G02F 1/1362* (2006.01)
*G02F 1/1368* (2006.01)
*G09G 3/36* (2006.01)

(52) U.S. Cl.
CPC .... *G02F 1/13439* (2013.01); *G02F 1/133512* (2013.01); *G02F 1/136286* (2013.01); *G09G 3/3674* (2013.01); *G09G 3/3685* (2013.01); *G02F 2001/13396* (2013.01); *G02F 2001/13398* (2013.01); *G02F 2001/136222* (2013.01); *G02F 2201/123* (2013.01); *G02F 2201/50* (2013.01); *G09G 2300/0426* (2013.01); *G09G 2310/08* (2013.01); *G09G 2330/04* (2013.01)

(58) Field of Classification Search
CPC ....... G09G 2300/0426; G09G 2310/08; G09G 2330/04; G09G 3/3674; G09G 3/3685
USPC ......................................... 345/590
See application file for complete search history.

(56) References Cited

U.S. PATENT DOCUMENTS

| | | | |
|---|---|---|---|
| 2011/0031480 A1* | 2/2011 | Nakamura | H01L 51/5215 257/40 |
| 2014/0022479 A1* | 1/2014 | Hosaka | G02F 1/1368 349/43 |
| 2014/0104508 A1* | 4/2014 | Yamazaki | G02F 1/13338 349/12 |
| 2015/0155169 A1* | 6/2015 | Oota | H01L 28/20 438/104 |
| 2015/0155505 A1* | 6/2015 | Yamazaki | H01L 27/3272 257/40 |
| 2016/0095172 A1* | 3/2016 | Lee | C23C 16/401 313/504 |
| 2016/0155984 A1* | 6/2016 | Yamazaki | H01L 51/0097 257/40 |
| 2017/0345847 A1* | 11/2017 | Kim | H01L 27/3276 |
| 2017/0357114 A1* | 12/2017 | Kim | G02F 1/133512 |
| 2018/0123084 A1* | 5/2018 | Kim | G06F 3/0412 |

* cited by examiner

DRIVER OF DISPLAY DEVICE AND MANUFACTURING METHOD OF THE SAME

This application claims priority to Korean Patent Application No. 10-2016-0071034, filed on Jun. 8, 2016, and all the benefits accruing therefrom under 35 U.S.C. § 119, the content of which in its entirety is herein incorporated by reference.

BACKGROUND

1. Field

Exemplary embodiments of the invention relate to a display device and a method of manufacturing the display device.

2. Description of the Related Art

Display devices may be classified into liquid crystal display ("LCD") devices, organic light emitting diode ("OLED") display devices, plasma display panel ("PDP") devices, electrophoretic display devices, and the like based on a light emitting scheme thereof.

Among those, an LCD device includes two substrates including electrodes formed thereon and a liquid crystal layer interposed between the two substrates. Upon applying voltage to the electrodes, liquid crystal molecules of the liquid crystal layer are rearranged such that an amount of transmitted light is controlled in the LCD device.

SUMMARY

Exemplary embodiments of the invention may be directed to a display device and a method of manufacturing the display device capable of substantially preventing defects due to permeated moisture.

According to an exemplary embodiment, a display device includes: a display substrate including a display area and a non-display area which is adjacent to the display area; and an opposing substrate opposing the display substrate. The display substrate includes: a pixel provided in plurality arranged in the display area; and in the non-display area: a gate driver including a gate wiring and a data wiring; an organic layer on the gate wiring and the data wiring; a column spacer on the organic layer; a connection portion commonly connected to the gate wiring and the data wiring at contact holes respectively exposing the gate wiring and the data wiring; and a protective layer on the connection portion. In a top plan view, the protective layer has a same shape as a shape of the connection portion. The opposing substrate includes a black matrix disposed at the display area to define a pixel area of the pixel at which an image is displayed, and disposed at the non-display area to define the display area and the non-display area of the display substrate.

The black matrix in the non-display area overlaps the protective layer.

In the non-display area, the protective layer may have a less height than a height of the column spacer with respect to a surface of the organic layer.

The protective layer and the column spacer may include a transparent material.

The protective layer and the column spacer may include an acrylic material.

The gate wiring and the data wiring may be disposed in different layers.

In the non-display area, the connection portion may electrically connect the gate wiring and the data wiring to each other.

The pixel may include: a gate electrode at the display area; a semiconductor layer insulated from and on the gate electrode; a source electrode and a drain electrode spaced apart from each other, on the semiconductor layer; and a pixel electrode connected to the drain electrode.

The pixel electrode and the connection portion may be in a same layer and include a substantially same material as each other.

According to an exemplary embodiment, a method of manufacturing a display device includes: preparing a display substrate including a display area at which an image is displayed and a non-display area at which the image is not displayed; preparing an opposing substrate which is coupled to the display substrate; and attaching the display substrate and the opposing substrate to each other. The preparing of the display substrate includes: forming a pixel in plurality at the display area; disposing a gate driver at the non-display area of the display substrate, the gate driver including a gate wiring and a data wiring; forming an organic layer on the gate wiring and the data wiring in the non-display area; defining contact holes in the organic layer and respectively exposing the gate wiring and the data wiring in the non-display area; forming a connection portion in the non-display area, the connection portion commonly connected to the gate wiring and the data wiring at the contact holes; and forming a column spacer and a protective layer on the organic layer in the non-display area. The forming of the protective layer forms the protective layer to have a same shape as a shape of the connection portion in a top plan view. The preparing of the opposite substrate includes: forming a black matrix at the display area to define a pixel area of the pixel at which the image is displayed, and at the non-display area to define the display area and the non-display area of the display substrate.

The forming of the column spacer and the protective layer may include: applying a light transmissive material on the organic layer in the display area and in the non-display area; disposing, on the light transmissive material, a mask including a light transmissive portion, a semi-light transmissive portion and a light blocking portion; and irradiating a light to the light transmissive material using the mask to expose the light transmissive material and form the column spacer and the protective layer. The disposing the mask includes disposing the semi-light transmissive portion of the mask above a portion of the light transmissive material which forms the protective layer.

The irradiating of the light to the light transmissive material to form the column spacer and the protective layer exposes a surface of the organic layer. In the non-display area, the protective layer may be formed to have a smaller height than a height of the column spacer with respect to the exposed surface of the organic layer.

The forming of the pixel may include: forming a gate electrode at the display area; forming a semiconductor layer to be insulated from and on the gate electrode; forming a source electrode and a drain electrode spaced apart from each other on the semiconductor layer; and forming a pixel electrode connected to the drain electrode. The forming of the gate electrode, the source electrode and the drain electrode may be performed in a substantially same process as a process in which the gate driver is formed.

The forming of the pixel electrode may be performed in a substantially same process as a process in which the connection portion is formed.

The foregoing is illustrative only and is not intended to be in any way limiting. In addition to the illustrative exemplary embodiments and features described above, further exemplary embodiments and features will become apparent by reference to the drawings and the following detailed description.

BRIEF DESCRIPTION OF THE DRAWINGS

A more complete appreciation of the invention will become more apparent by describing in detail exemplary embodiments thereof with reference to the accompanying drawings, where.

DETAILED DESCRIPTION

Exemplary embodiments will now be described more fully hereinafter with reference to the accompanying drawings. Although the invention may be modified in various manners and have several exemplary embodiments, exemplary embodiments are illustrated in the accompanying drawings and will be mainly described in the specification. However, the scope of the invention is not limited to the exemplary embodiments and should be construed as including all the changes, equivalents, and substitutions included in the spirit and scope of the invention.

In the drawings, thicknesses of a plurality of layers and areas are illustrated in an enlarged manner for clarity and ease of description thereof. When a layer, area, or plate is referred to as being related to another element such as being "on" another layer, area, or plate, it may be directly on the other layer, area, or plate, or intervening layers, areas, or plates may be present therebetween. Conversely, when a layer, area, or plate is referred to as being related to another element such as being "directly on" another layer, area, or plate, intervening layers, areas, or plates may be absent therebetween. Further when a layer, area, or plate is referred to as being related to another element such as being "below" another layer, area, or plate, it may be directly below the other layer, area, or plate, or intervening layers, areas, or plates may be present therebetween. Conversely, when a layer, area, or plate is referred to as being related to another element as being "directly below" another layer, area, or plate, intervening layers, areas, or plates may be absent therebetween.

The spatially relative terms "below," "beneath," "less," "above," "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "physically connected" to the other element or "electrically connected" to the other element with one or more intervening elements interposed therebetween. The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Some of the parts which are not associated with the description may not be provided in order to specifically describe exemplary embodiments of the present invention, and like reference numerals refer to like elements throughout the specification.

A display device such as a liquid crystal display ("LCD") device uses a sealing member to seal a liquid crystal layer between two display substrates, and such a sealing member is relatively vulnerable to moisture permeation due to material characteristics thereof. Accordingly, elements placed on a base substrate within a display substrate may be damaged by moisture permeated into the LCD device.

Hereinafter, one or more embodiment of a display device according to the invention will be described on the premise that it is a liquid crystal display ("LCD") device. However, the scope of the invention is not limited to the LCD devices, and the invention may be applicable to organic light emitting diode ("OLED") display devices, for example.

Figure 1:
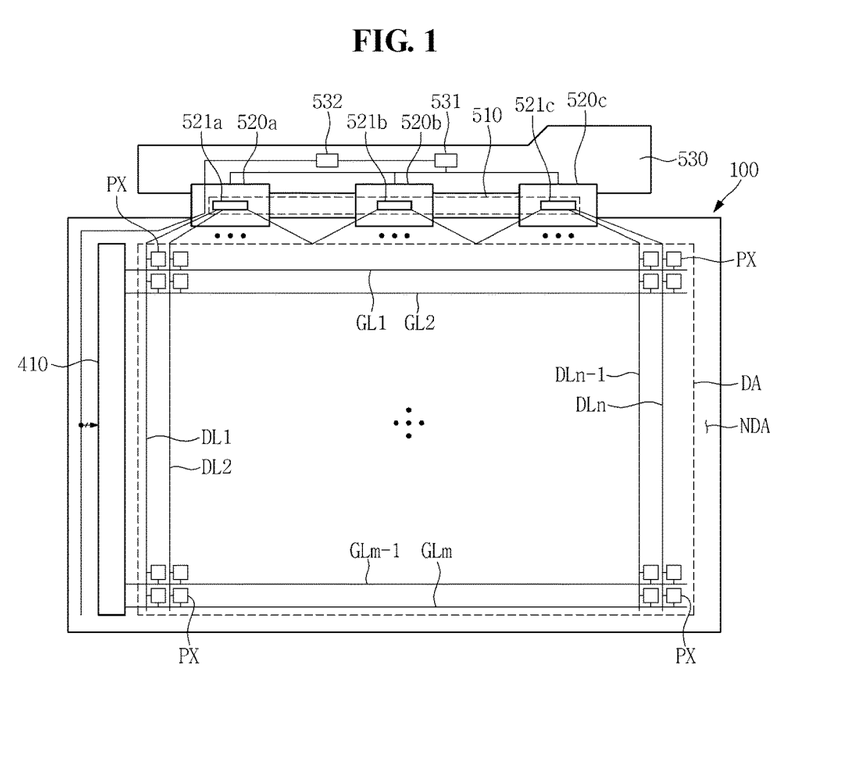
FIG. 1 is a schematic top plan view illustrating an exemplary embodiment of a display device according to the invention.

FIG. 1 is a schematic top plan view illustrating an exemplary embodiment of a display device according to the invention.

Referring to FIG. 1, the display device according to one or more exemplary embodiment may include a display substrate 100, a gate driver 410 which outputs a gate voltage as a signal, a data driver 510 which outputs a data voltage as a signal, and the like.

The display substrate 100 may include a display area DA at which an image is displayed with light and a non-display area NDA around the display area DA and at which the image is not displayed.

The display substrate 100 may include a plurality of gate lines GL1 to GLm (or GL used to indicate one or more gate line) at the display area DA, a plurality of data lines DL1 to DLn (or DL used to indicate one or more data line) insulated from and intersecting the plurality of gate lines GL1 to GL, and a pixel PX provided in plurality at the display area DA to be connected to corresponding ones of the plurality of gate lines GL1 to GLm and the plurality of data lines DL1 to DLn to display an image.

The gate driver 410 may be disposed at the non-display area NDA of the display substrate 100.

The gate driver 410 may be disposed adjacent to one end portion of the plurality of gate lines GL1 to GLm. The gate driver 410 is electrically connected to said one end portion of the plurality of gate lines GL1 to GLm and sequentially applies gate voltages to the plurality of gate lines GL1 to GLm. The gate driver 410 may be commonly connected to each of the plurality of gate lines GL1 to GLm at first ends thereof, to sequentially apply the gate voltages to the plurality of gate lines GL1 to GLm.

In an exemplary embodiment of manufacturing the display device, elements or layers of the gate driver 410 may be formed substantially simultaneously with the plurality of gate lines GL and the plurality of data lines DL such as through a thin film process. In an exemplary embodiment, for example, the gate driver 410 may be mounted at the non-display area NDA of the display substrate 100 in the form of an amorphous silicon thin film transistor gate ("ASG") driver circuit. As being formed substantially simultaneously with the plurality of gate lines GL and the plurality of data lines DL, elements or layers of the gate driver 410 may be formed from a same material layer as that of the plurality of gate lines GL and the plurality of data lines DL to be disposed in a same layer of the display substrate 100 among various layers thereof.

In FIG. 1, the gate driver 410 is depicted as being disposed on one (first) side (e.g., a left side) of the display substrate 100 in the top plan view, but exemplary embodiments are not limited thereto. The gate driver 410 may be disposed on a different (second) side from the left side (e.g., a right side) of the display substrate 100, or may be disposed on both of the first and second sides of the display substrate 100.

The data driver 510 may be disposed adjacent to one end portion of the plurality of data lines DL1 to DLn. The data driver 510 may include a plurality of driving circuit boards 520a, 520b and 520c. In an exemplary embodiment, for example, the plurality of driving circuit boards 520a, 520b and 520c may be a tape carrier package ("TCP") or a chip on film ("COF").

A plurality of data driving integrated circuits ("IC"s) 521a, 521b and 521c are respectively mounted on the plurality of driving circuit boards 520a, 520b and 520c. The plurality of data driving ICs 521a, 521b and 521c are electrically connected to one end portion of the plurality of data lines DL1 to DLn to output the data voltage to the plurality of data lines DL1 to DLn. Each data driving IC may be commonly connected to more than one of the plurality of data lines DL1 to DLn to output the data voltages to the more than one data line.

The display device according to an exemplary embodiment further includes a control printed circuit board ("PCB") 530 to control driving of the gate driver 410 and the plurality of data driving ICs 521a, 521b and 521c. The PCB 530 may be commonly connected to each of the gate driver 410 and the plurality of data driving ICs 521a, 521b and 521c.

The control PCB 530 outputs a data control signal to control driving of the plurality of data driving ICs 521a, 521b and 521c, an image data, and a gate control signal to control driving of the gate driver 410.

The control PCB 530 includes a timing controller 531 which receives an image data from an external source (not shown) and generates the data control signal and the gate control signal, and a gate control circuit 532 which generates the gate control signal. However, exemplary embodiments are not limited thereto, and the control PCB 530 may be a data PCB which receives a control signal from another PCB including a timing controller, generates a data control signal and outputs the data control signal.

The timing controller 531 controls driving of the plurality of data driving ICs 521a, 521b and 521c and the gate driver 410. The gate control circuit 532 generates a clock signal for driving the gate driver 410 and a start signal to indicate the start of the gate signal.

The control PCB 530 applies the data control signal and the image data to the plurality of data driving ICs 521a, 521b and 521c through the plurality of driving circuit boards 520a, 520b and 520c. In addition, the control PCB 530 may apply the gate control signal to the gate driver 410 through a driving circuit board 520a that is adjacent to the gate driver 410.

Figure 2:
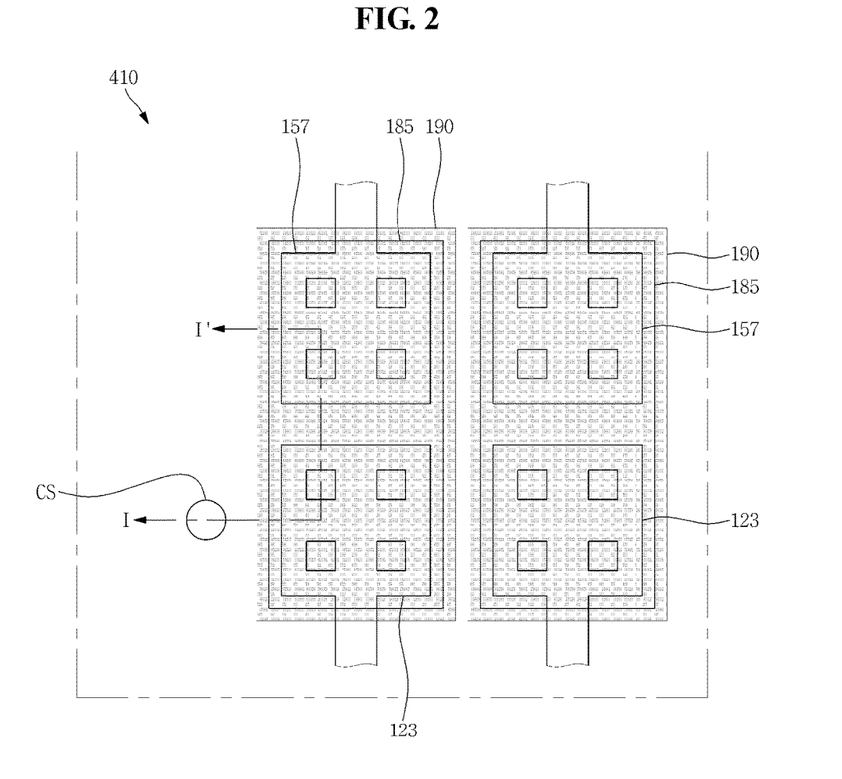
FIG. 2 is an enlarged top plan view illustrating an exemplary embodiment of a portion of a gate driver of a display device according to the invention.
Figure 3:
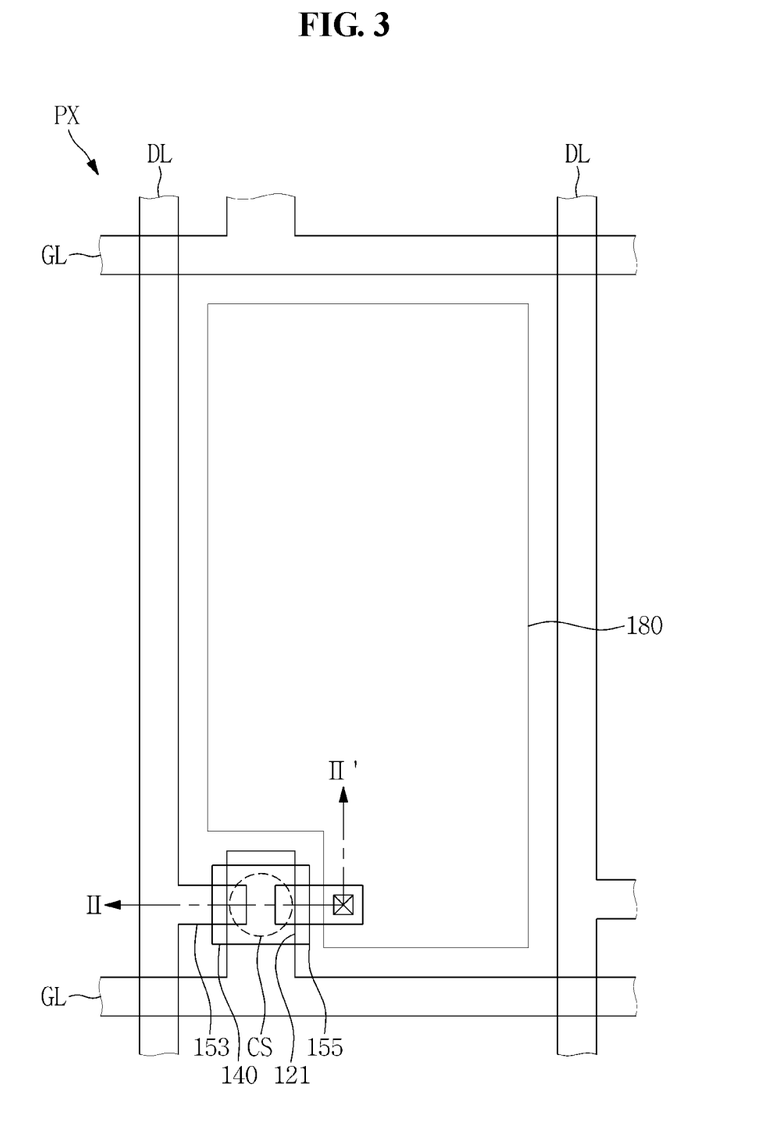
FIG. 3 is an enlarged top plan view illustrating an exemplary embodiment of a pixel of a display device according to the invention.
Figure 4:
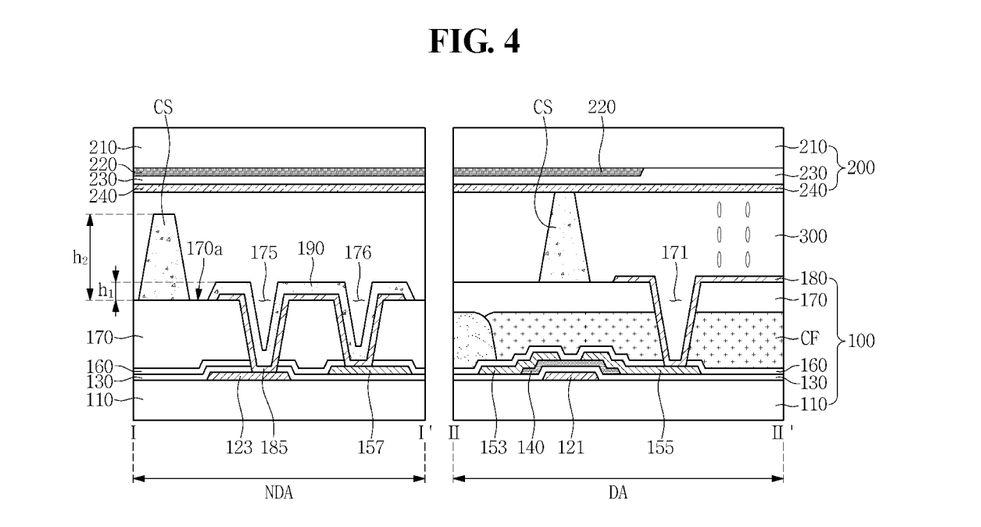
FIG. 4 is a cross-sectional view of the display device taken along line I-I' of FIG. 2 and line II-IP of FIG. 3.

FIG. 2 is a top plan view illustrating an enlarged portion of an exemplary embodiment of a gate driver of a display device according to the invention, FIG. 3 is an enlarged top plan view illustrating an exemplary embodiment of a pixel according to the invention, and FIG. 4 is a cross-sectional view of the display device taken along line I-I' of FIG. 2 and line II-II' of FIG. 3. In particular, FIG. 2 is a top plan view illustrating a connection node between a control electrode 123 and an output electrode 157 in the gate driver 410 according to an exemplary embodiment of the display device.

Referring to FIGS. 2, 3 and 4, one or more exemplary embodiment of the display device according to the invention may include the display substrate 100, an opposing substrate 200 and an optical medium layer such as a liquid crystal layer 300 between the display substrate 100 and the opposing substrate 200 to control transmittance of light through the display device. The display substrate 100 and the opposing substrate 200 including various elements and layers thereof, and the optical medium layer may collectively form a display panel of the display device. The display substrate 100 and the opposing substrate 200, along with elements thereof may be disposed in a plane defined by a first direction (horizontal in FIGS. 1-3) and a second direction (vertical in FIGS. 1-3). A thickness direction of the display device and components thereof is defined in a third direction (cross-section or vertical in FIG. 4).

In addition, one or more exemplary embodiment of the display device according to the invention may further include a backlight unit (not illustrated) that outputs light toward the display substrate 100.

The display substrate 100 may include a first base substrate 110, a gate wiring GL, 121 and 123, a first insulating layer 130, a semiconductor layer 140, a data wiring DL, 153, 155 and 157, a second insulating layer 160, a color filter CF, an organic layer 170, a pixel electrode 180, a connection portion 185, a protective layer 190, a column spacer CS, and the like.

The first base substrate 110 may be an insulating substrate having light transmitting characteristics and/or flexible characteristics like a plastic substrate. However, exemplary embodiments are not limited thereto, and the first base substrate 110 may include a relatively hard and inflexible substrate such as a glass substrate.

The gate wiring GL, 121 and 123 including a gate line GL, a gate electrode 121 branching from the gate line GL, a control electrode 123, and the like may be disposed on the first base substrate 110. The control electrode 123 in the non-display area NDA may be a terminal end of a gate line GL in the display area DA, but the invention is not limited thereto.

The gate wiring GL, 121 and 123 may include or be formed of aluminum (Al) or alloys thereof, silver (Ag) or alloys thereof, copper (Cu) or alloys thereof, molybdenum (Mo) or alloys thereof, chromium (Cr), tantalum (Ta) and titanium (Ti).

In addition, the gate wiring GL, 121 and 123 may have a multilayer structure including two or more conductive layers (not illustrated) having different physical properties from each other. In an exemplary embodiment, for example, a conductive layer of the multilayer structure may include or be formed of a metal having relatively low resistivity to reduce electrical signal delay or voltage drop, e.g., an aluminum (Al)-based metal, a silver (Ag)-based metal and a copper (Cu)-based metal, and another conductive layer of the multilayer structure may include a material that imparts excellent contact properties with indium tin oxide ("ITO") and indium zinc oxide ("IZO"), e.g., a molybdenum-based metal, chromium, titanium, tantalum, and the like.

With reference to the cross-sectional view of FIG. 4, examples of the multilayer structure may include a chromium lower layer and an aluminum upper layer, an aluminum lower layer and a molybdenum upper layer, and a titanium lower layer and a copper upper layer. However, exemplary embodiments are not limited thereto, and the gate wiring GL, 121 and 123 may include various kinds of metals and conductors. In an exemplary embodiment of manufacturing the display device, the gate wiring GL, 121 and 123 may be simultaneously formed in a substantially same process. As being formed substantially simultaneously in a same process, elements or layers of the gate wiring GL, 121 and 123 may be formed from a same material layer as each other to be respectively disposed in a same layer of the display substrate 100 as each other.

The first insulating layer 130 may be disposed on the first base substrate 110 including the gate wiring GL, 121 and 123 thereon. The first insulating layer 130 may be referred to as a gate insulating layer. The first insulating layer 130 may include silicon oxide (SiOx) or silicon nitride (SiNx). In addition, the first insulating layer 130 may further include aluminum oxide, titanium oxide, tantalum oxide or zirconium oxide.

The semiconductor layer 140 may be disposed on the first insulating layer 130. The semiconductor layer 140 may include an amorphous silicon or an oxide semiconductor including at least one of gallium (Ga), indium (In), tin (Sn) and zinc (Zn).

In an exemplary embodiment, for example, the oxide semiconductor may include at least one selected from zinc oxide ("ZnO"), zinc-tin oxide ("ZTO"), zinc-indium oxide ("ZIO"), indium oxide ("InO"), titanium oxide ("TiO"), indium-gallium-zinc oxide ("IGZO") and indium-zinc-tin oxide ("IZTO"). Although not illustrated, an ohmic contact layer may be disposed on the semiconductor layer 140.

In an exemplary embodiment, the semiconductor layer 140 is depicted as substantially overlapping the gate electrode 121, but exemplary embodiments are not limited thereto. The semiconductor layer 140 may be disposed so as to substantially overlap the data wiring to be described below.

The data wiring DL, 153, 155 and 157 including a data line DL, a source electrode 153 branching from the data line DL, a drain electrode 155 spaced apart from the source electrode 153, and the output electrode 157 may be disposed on the first base substrate 110 including the semiconductor layer 140 thereon. The output electrode 157 may be a terminal end of a signal line through which the clock signal and/or gate signal from the gate control circuit 532 transmits to the gate driver 410 for driving the gate driver 410. The gate electrode 121, the semiconductor layer 140, the source electrode 153 and the drain electrode 155 may be constituent elements of a switching element such as a thin film transistor, to control operation of a pixel to display an image.

The data wiring DL, 153, 155 and 157 may include a substantially same material as that included in the aforementioned gate wiring GL, 121 and 123. In an exemplary embodiment of manufacturing a display device, the data wiring DL, 153, 155 and 157 may be formed simultaneously in a substantially same process. As being formed substantially simultaneously in a same process, elements or layers of the data wiring DL, 153, 155 and 157 may be formed from a same material layer as each other to be respectively disposed in a same layer of the display substrate 100 as each other.

The second insulating layer 160 may be disposed on the first base substrate 110 including the data wiring DL, 153, 155 and 157 thereon. The second insulating layer 160 is also referred to as an insulating interlayer. The second insulating layer 160 may include silicon oxide (SiOx) or silicon nitride (SiNx). In addition, the second insulating layer 160 may further include aluminum oxide, titanium oxide, tantalum oxide or zirconium oxide.

The color filter CF may be disposed on the second insulating layer 160. The color filter CF may be disposed in plurality on the second insulating layer 160, as shown by the different patterns in FIG. 4. The color filter CF may have a color selected from red, green, blue, cyan, magenta, yellow and white. Three primary colors of red, green and blue, or cyan, magenta and yellow may define a basic pixel group for representing a color of light at a pixel PX.

The organic layer 170 may be disposed on the first base substrate 110 including the color filter CF thereon. The organic layer 170 may have a monolayer structure or a multilayer structure including, for example, silicon oxide, silicon nitride, a photosensitive organic material, or a silicon-based relatively low dielectric constant insulating material. The organic layer 170 may have a cross-sectional thickness in a range of about 1.0 micrometer (µm) to about 3.5 micrometers (µm). Such thickness may be a maximum or total cross-sectional thickness of the organic layer 170 taken in a thickness direction of the display device.

The pixel electrode 180 connected to the drain electrode 155 through and at a first contact hole 171 defined in each of the second insulating layer 160, the color filter CF and the organic layer 170, may be disposed on the organic layer 170 at the display area DA.

The pixel electrode 180 may have a planar shape in the top plan view including a whole plate electrode or an electrode including a stem portion and branch portions which diagonally extend from the stem portion. The pixel electrode 180 may include a transparent conductive material such as indium tin oxide ("ITO"), indium zinc oxide ("IZO"), indium tin zinc oxide ("ITZO"), aluminum zinc oxide ("AZO"), or the like.

In addition, the connection portion 185 connected to the control electrode 123 through a second contact hole 175 defined in each of the first insulating layer 130, the second insulating layer 160 and the organic layer 170, and connected to the output electrode 157 through a third contact hole 176 defined in each of the second insulating layer 160 and the organic layer 170, may be disposed on the organic layer 170 at the non-display area NDA. The connection electrode 185 may be commonly connected to each of the control electrode 123 and the output electrode 157 to connect these two elements to each other. Signals from the PCB 530 transmitted to the gate driver 410 may transmit through the connection electrode 185 to be applied to pixels PX of the display area, but the invention is not limited thereto.

The connection portion 185 according to an exemplary embodiment is described on the premise of a bridge electrode that electrically connects the control electrode 123 and the output electrode 157 to each other within the gate driver 410, but exemplary embodiments are not limited thereto. In an exemplary embodiment, the connection portion 185 according to an exemplary embodiment may include any conductive material that is connected to the gate wiring or the data wiring exposed through the contact hole at the non-display area NDA, such as to commonly connect the gate and data wirings to each other at the non-display area NDA.

The connection portion 185 may include a substantially same material as that included in the aforementioned pixel electrode 180. In an exemplary embodiment, elements or layers of the connection portion 185 may be formed from a same material layer as the pixel electrode 180 to be disposed in a same layer of the display substrate 100 as each other.

The column spacer CS and the protective layer 190 may be disposed on the first base substrate 110 including the pixel electrode 180 and the connection portion 185 thereon. The column spacers CS may be provided in plurality within the display device.

The column spacers CS which protrudes from a surface 170a of the organic layer 170 may be classified into a main column spacer or a sub-column spacer according to the height thereof from the surface 170a. The main column spacer substantially supports the display substrate 100 and the opposing substrate 200 to secure a space therebetween and when pressure is externally applied to the main column spacer, the sub-column spacer distributes the pressure to absorb the impact.

The column spacers CS may have an overall a cylindrical or truncated cone shape. The column spacer CS may include a material having light transmittance and/or elasticity such as acryl or the like.

The protective layer 190 may be disposed on the connection portion 185 at the non-display area NDA. The protective layer 190 may be disposed so as to completely cover the connection portion 185 in the top plan view, and may have a substantially same shape as a shape of the connection portion 185 in the top plan view. As illustrated in FIG. 2, the protective layer 190 is a discrete shape having edges spaced apart from an adjacent protective layer 190. In an alternative exemplary embodiment, a single protective layer 190 may commonly cover adjacent connection portions 185, such as commonly cover the left and right connection portions 185 in FIG. 2.

As illustrated in FIG. 4, the protective layer 190 is disposed on the connection portion 185, and extends further than outer edges of the connection portion 185 along side surfaces thereof, to contact the surface 170a of the organic layer 170. Taking FIGS. 2 and 4 together, the protective layer 190 may extend further then all outer edges of the connection portion 185 to be disposed along all side surfaces thereof to contact the surface 170a of the organic layer 170. As such the protective layer 190 may completely cover and seal the connection portion 185 such that no portion of the connection portion 185 is exposed outside the protective layer 190.

In an exemplary embodiment, for example, referring to FIG. 2, the connection portion 185 may have a rectangular planar shape in the top plan view, and the protective layer 190 may be disposed to completely cover the connection portion 185, having a rectangular planar shape on the top plan view which is the same as the shape of the connection portion 185.

That is, by completely covering the connection portion 185, the protective layer 190 may substantially prevent direct contact of the connection portion 185 with moisture or the like that is permeated into the liquid crystal layer 300 by sealing the connection portion 185.

The protective layer 190 may include a substantially same material as that included in the column spacer CS described above. That is, the protective layer 190 may also include a material having light transmittance and elasticity such as acryl or the like. In an exemplary embodiment of manufacturing a display device, the column spacer CS and the protective layer 190 may be simultaneously formed in a substantially same process. As being formed substantially simultaneously in a same process, the column spacer CS may be formed from a same material layer as the protective layer 190 to be disposed in a same layer of the display device as each other.

In addition, the protective layer 190 may have a less height than the height of the column spacer CS with respect to the surface 170a of the organic layer 170. That is, a height h1 of the protective layer 190 may be less than a height h2 of the column spacer CS with reference to the surface 170a of the organic layer 170.

Since the protective layer 190 has a less height than the height of the column spacer CS, defects due to degradation of liquid crystal fluidity may be substantially prevented.

A lower alignment layer (not illustrated) may be disposed in the display substrate 100 such as commonly on the pixel electrode 180, the column spacer CS and the protective layer 190. The lower alignment layer may be a vertical alignment layer or a photo alignment layer including a photopolymerizable material.

The opposing substrate 200 includes a second base substrate 210, a black matrix 220, an overcoat layer 230, a common electrode 240, and the like.

The second base substrate 210 may be an insulating substrate having light transmittance and/or flexibility like a plastic substrate. However, exemplary embodiments are not limited thereto, and the second base substrate 210 may include a relatively hard substrate such as a glass substrate.

The black matrix 220 is disposed on the second base substrate 210. The black matrix 220 may be disposed at the display area DA to define a pixel area within the pixel PX and may be disposed at the non-display area NDA to define the display area DA and the non-display area NDA relative to each other. The pixel PX of the display area DA may include the pixel area at which the image is displayed and a non-pixel area at which the image is not displayed.

The black matrix 220 may include a metal such as chromium oxide (CrOx), an opaque organic layer material, a photosensitive composition, or the like. Examples of the photosensitive composition may include: a binder resin, a polymerizable monomer, a polymerizable oligomer, a pigment, a dispersant and a photoinitiator. The pigment may use a black pigment, a black resin, or the like.

The overcoat layer 230 is disposed on the black matrix 220. The overcoat layer 230 may planarize an uneven surface of a layer therebelow toward the second base substrate 210, e.g., the black matrix 220, and/or efficiently suppress or prevent elution of impurities from a layer therebelow.

The common electrode 240 may be disposed on the overcoat layer 230. The common electrode 240 may be a whole plate electrode in the top plan view including a transparent conductor such as indium tin oxide ("ITO") or indium zinc oxide ("IZO"). In an alternative exemplary embodiment, the common electrode 240 may include a concave-convex shape and at least one slit for defining a plurality of domains within the pixel PX.

An upper alignment layer (not illustrated) may be disposed on the common electrode 240. The upper alignment layer (not illustrated) may be a vertical alignment layer or a photo alignment layer including a photopolymerizable material.

FIGS. 5A, 5B, 5C, 5D, 5E, 5F and 5G are cross-sectional views illustrating an exemplary embodiment of a method of manufacturing a display device according to the invention.

One or more embodiment of a method of manufacturing a display device according to the invention may include forming a display substrate, forming an opposing substrate, and attaching the display substrate and the opposing substrate together such as to define a display panel of the display device.

Forming of the display substrate may include dividing the display substrate into a display area at which an image is displayed with light and a non-display area which is around the display area and at which the image is not displayed, forming a pixel in plurality at the display area, and forming a gate driver at the non-display area.

A gate wiring and a data wiring constituting the gate driver at the non-display area may be formed substantially simultaneously with and respectively from a same material layer as that of a gate wiring and a data wiring constituting the pixel at the display area, such as through a thin film process.

Forming of the opposing substrate includes forming a black matrix at a portion of the display area and the non-display area.

Hereinafter, one or more exemplary embodiment of a method of forming a display substrate according to the invention will be described with reference to FIGS. 5A, 5B, 5C, 5D, 5E, 5F and 5G.

Figure 5A:
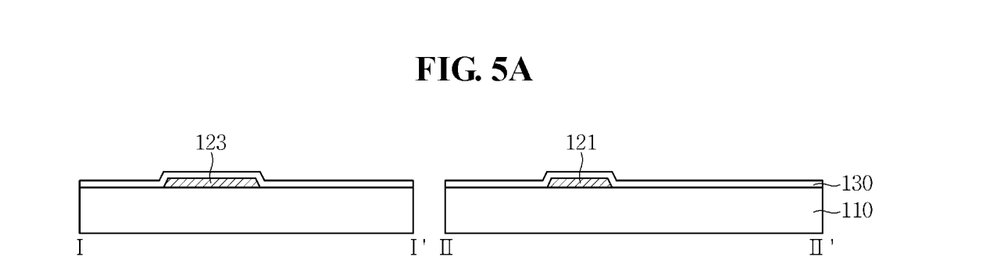
FIGS. 5A, 5B, 5C, 5D, 5E, 5F and 5G are cross-sectional views illustrating an exemplary embodiment of a method of manufacturing a display device according to the invention.

Referring to FIG. 5A, a gate wiring 121 and 123 including a gate electrode 121 and a control electrode 123 is formed on a first base substrate 110 including transparent glass or plastic. The gate wirings 121 and 123 may be formed in a substantially same layer and from a same material layer, and may be formed in a substantially same process as each other.

A first insulating layer 130 is coated on the first base substrate 110 including which the gate wiring 121 and 123 thereon. The first insulating layer 130 may be formed through a chemical vapor deposition ("CVD") process, a spin coating process, a sputtering process, a vacuum deposition process, a printing process, or the like.

Figure 5B:
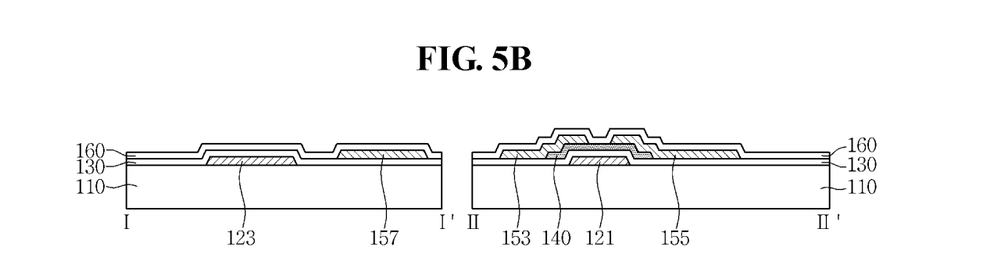

Referring to FIG. 5B, a semiconductor layer 140 may be formed on the first base substrate 110 including the first insulating layer 130 thereon, to overlap the gate electrode 121. Subsequently, a data wiring 153, 155 and 157 including a source electrode 153, a drain electrode 155 and an output electrode 157 is formed on the semiconductor layer 140 and the first insulating layer 130.

The source electrode 153 may be formed to overlap a first end portion of the semiconductor layer 140 and the drain electrode 155 may be spaced apart from the source electrode 153 to overlap a second end portion of the semiconductor layer 140 opposite to the first end portion thereof.

The data wiring 153, 155 and 157 may be formed in a substantially same layer and from a same material layer, and may be formed in a substantially same process as each other.

Subsequently, a second insulating layer 160 is applied over the first base substrate 110 including the data wiring 153, 155 and 157 thereon. The second insulating layer 160 may be formed through a chemical vapor deposition ("CVD") process, a spin coating process, a sputtering process, a vacuum deposition process, a printing process, or the like.

Figure 5C:
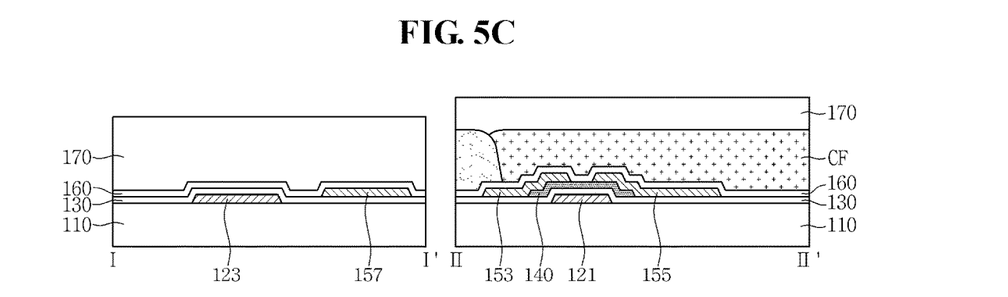

Referring to FIG. 5C, a color filter CF may be formed on the second insulating layer 160 in the display area. Subsequently, an organic layer 170 may be applied on the color filter CF in the display area and on the second insulating layer 160 in the non-display area. The organic layer 170 may be formed through a chemical vapor deposition process, a spin coating process, a sputtering process, a vacuum deposition process, a printing process, or the like.

Figure 5D:
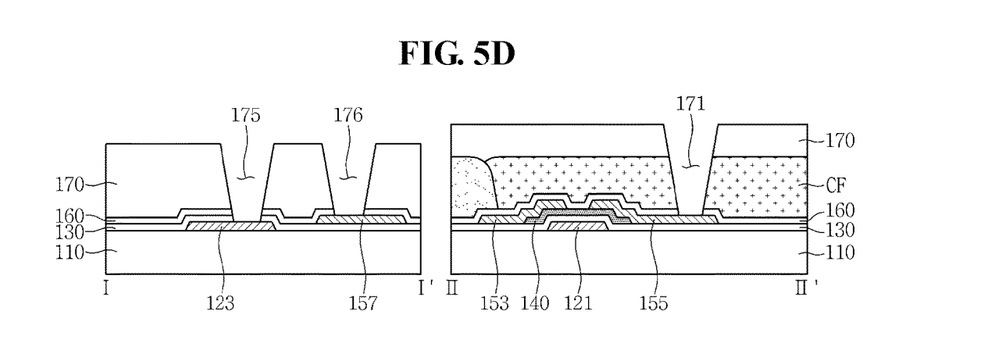

Referring to FIG. 5D, a first contact hole 171 that is defined through the second insulating layer 160, the color filter CF and the organic layer 170 to expose a portion of the drain electrode 155, a second contact hole 175 that is defined through the first insulating layer 130, the second insulating layer 160 and the organic layer 170 to expose a portion of the control electrode 123, and a third contact hole 176 that is defined through the second insulating layer 160 and the organic layer 170 to expose a portion of the output electrode 157 are defined. The first contact hole 171, the second contact hole 175 and the third contact hole 176 may be defined in a substantially same process.

Figure 5E:
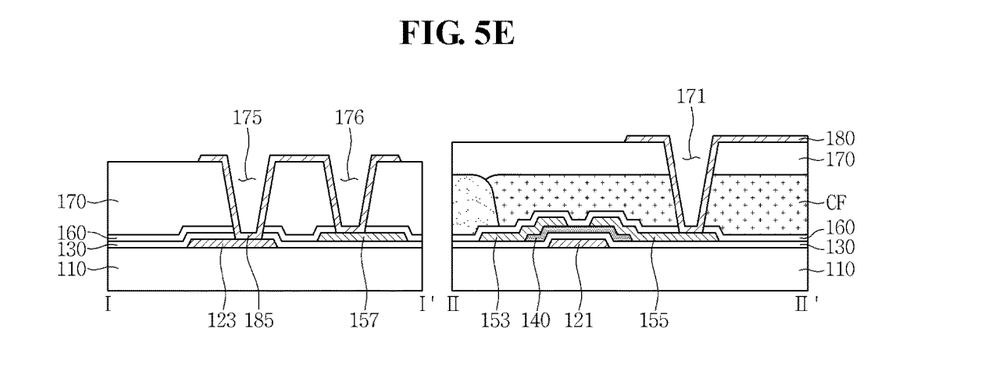

Referring to FIG. 5E, a pixel electrode 180 connected to the drain electrode 155 through the first contact hole 171 may be formed on the organic layer 170. A connection portion 185 commonly connected to the control electrode 123 and the output electrode 157 through the second contact hole 175 and the third contact hole 176 may be formed on the organic layer 170.

Figure 5F:
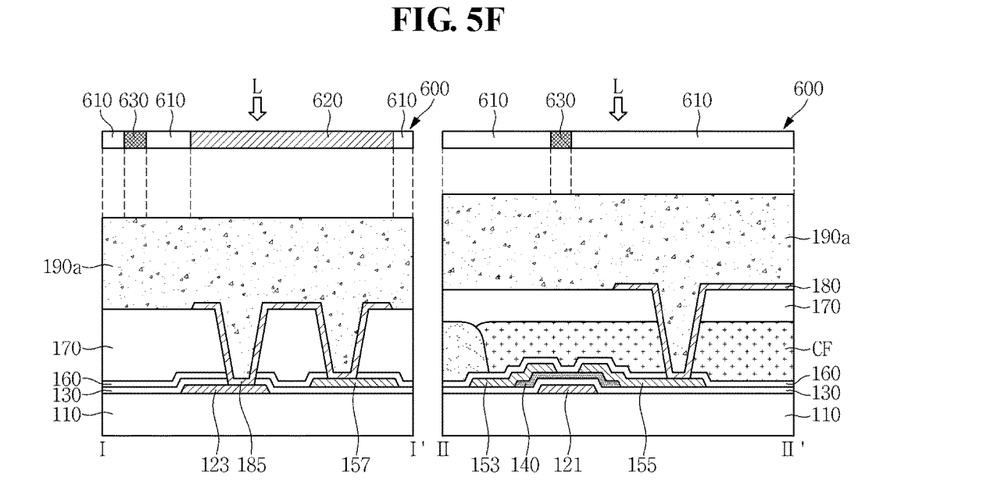

Referring to FIG. 5F, a column spacer and protective layer forming material 190a may be applied over the first base substrate 110 including the pixel electrode 180 and the connection portion 185 thereon. The column spacer and protective layer forming material 190a may be commonly formed in the display area and the non-display area, such as on a whole surface of the first base substrate 110.

The column spacer and protective layer forming material 190a may be formed through a chemical vapor deposition ("CVD") process, a spin coating process, a sputtering process, a vacuum deposition process, a printing process, or the like.

The column spacer and protective layer forming material 190a may include a material having light transmittance and elasticity such as acryl. The column spacer and protective layer forming material 190a according to an exemplary embodiment will be described on the premise as a positive type material of which an exposed portion is developed to be removed and a non-exposed portion remains, but exemplary embodiments are not limited thereto.

Subsequently, a mask 600 is disposed above the column spacer and protective layer forming material 190a, spaced apart therefrom. A same mask 600 may be commonly disposed over the display area and the non-display area. The mask 600 is a three-tone mask including, for example, a light transmissive portion 610, a semi-light transmissive portion 620 and a light blocking portion 630, each having different light transmittance properties. In an alternative exemplary embodiment, the mask 600 may include a slit portion instead of the semi-light transmissive portion 620.

The light transmissive portion 610 may have a light transmittance of about 95% or more, the semi-light transmissive portion 620 may have a light transmittance ranging from about 15% to about 20%, and the light blocking portion 630 may have a light transmittance of about 5% or less.

The semi-light transmissive portion 620 may be located above an area of the column spacer and protective layer forming material 190a at the connection portion 185 as an area at which a protective layer is to be formed, the light blocking portion 630 may be located above an area of the column spacer and protective layer forming material 190a where a column spacer is to be formed, and the light transmissive portion 610 may be located above a remaining area of the column spacer and protective layer forming material 190a. In an alternative exemplary embodiment, a four-tone mask may be used when forming two column spacers of different heights.

Subsequently, a light L is irradiated using the mask 600 for developing and curing portions of the column spacer and protective layer forming material 190a.

Figure 5G:
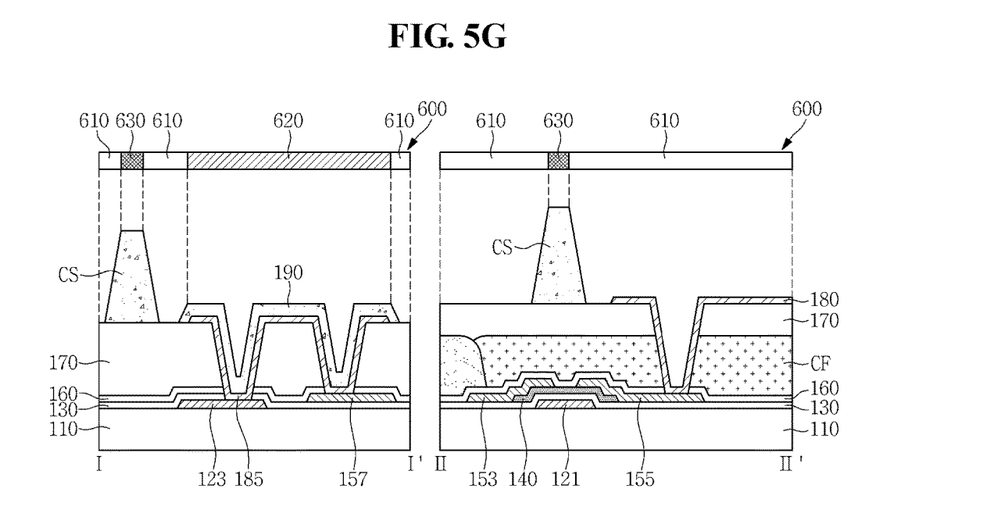

Referring to FIG. 5G, a portion of the column spacer and protective layer forming material 190a below the light transmissive portion 610 is completely removed such that portions of the organic layer 170 are exposed. The exposed portions of the organic layer 170 may define a surface 170a of the exposed organic layer 170.

Portions of the column spacer and protective layer forming material 190a below the semi-light transmissive portion 620 and below the light blocking portion 630 remain, each having different thicknesses. That is, the portion of the column spacer and protective layer forming material 190a below the semi-light transmissive portion 620 is partially removed to form a protective layer 190, and the portion of the column spacer and protective layer forming material below the light blocking portion 630 intactly remains (e.g., substantially an entire of an original thickness of the column spacer and protective layer forming material 190a) to form the column spacer CS.

As such, the protective layer 190 may be formed to have a less height (h1 in FIG. 4) than a height (h2 in FIG. 4) of the column spacer CS with respect to the surface 170a of the organic layer 170, such that defects due to degradation of liquid crystal fluidity may be substantially prevented.

As set forth hereinabove, the display device and the method of manufacturing the display device according to one or more exemplary embodiments may substantially prevent gate driver defects by disposing the protective layer to cover the connection portion, which is connected through contact holes to the gate wiring forming the gate driver and the data wiring, so that the connection portion may not directly contact moisture or the like.

While the present invention has been illustrated and described with reference to the exemplary embodiments thereof, it will be apparent to those of ordinary skill in the art that various changes in form and detail may be made thereto without departing from the spirit and scope of the present invention.

What is claimed is:

1. A display device comprising:
    a display substrate comprising:
        a display area at which an image is displayed, and
        a non-display area at which the image is not displayed; and
    an opposing substrate opposing the display substrate,
    wherein
    the display substrate comprises:
        a pixel provided in plurality arranged in the display area; and
        in the non-display area:
            a gate driver disposed adjacent to a gate wiring and a data wiring;
            an organic layer on the gate wiring and the data wiring;
            a column spacer on the organic layer;
            a connection portion which is conductive and commonly connected to the gate wiring and the data wiring at contact holes respectively exposing the gate wiring and the data wiring; and
            a protective layer on the connection portion,
            wherein in a top plan view, the protective layer completely covers the connection portion to have a same shape as a shape of the connection portion, and
    the opposing substrate comprises a black matrix disposed at the display area to define a pixel area of the pixel at which the image is displayed, and disposed at the non-display area to define the display area and the non-display area of the display substrate.

2. The display device as claimed in claim 1, wherein the black matrix in the non-display area overlaps the protective layer on the connection portion.

3. The display device as claimed in claim 1, wherein in the non-display area, the protective layer has a smaller height than a height of the column spacer, with respect to a surface of the organic layer.

4. The display device as claimed in claim 1, wherein the protective layer and the column spacer comprise a transparent material.

5. The display device as claimed in claim 4, wherein the protective layer and the column spacer comprise an acrylic material.

6. The display device as claimed in claim 1, wherein the gate wiring and the data wiring are disposed in different layers.

7. The display device as claimed in claim 1, wherein in the non-display area, the connection portion electrically connects the gate wiring and the data wiring to each other.

8. The display device as claimed in claim 1, wherein the pixel at the display area comprises:
 a gate electrode at the display area;
 a semiconductor layer on and insulated from the gate electrode;
 a source electrode and a drain electrode spaced apart from each other, on the semiconductor layer; and
 a pixel electrode connected to the drain electrode.

9. The display device as claimed in claim 8, wherein the pixel electrode and the connection portion are in a same layer and comprise a same material as each other.

10. A method of manufacturing a display device, the method comprising:
 preparing a display substrate including a display area at which an image is displayed and a non-display area at which the image is not displayed;
 preparing an opposing substrate which is coupled to the display substrate; and
 attaching the display substrate and the opposing substrate to each other,
 wherein
 the preparing of the display substrate comprises:
  forming a pixel in plurality at the display area of a display substrate;
  disposing a gate driver at the non-display area of the display substrate, the gate driver comprising a gate wiring and a data wiring in the non-display area;
  forming an organic layer in the display area and on the gate wiring and the data wiring in the non-display area;
  defining contact holes in the organic layer and respectively exposing the gate wiring and the data wiring in the non-display area;
  forming a connection portion in the non-display area, the connection portion being conductive and commonly connected to the gate wiring and the data wiring at the contact holes respectively; and
  forming a protective layer on the organic layer in the non-display area,
  wherein the forming of the protective layer forms the protective layer completely covering the connection portion to have a same shape as a shape of the connection portion in a top plan view; and
 the preparing of the opposite substrate comprises forming a black matrix at the display area to define a pixel area of the pixel at which the image is displayed, and at the non-display area to define the display area and the non-display area of the display substrate.

11. The method as claimed in claim 10, further comprising forming a column spacer on the organic layer in the non-display area,
 wherein the forming of the column spacer and the protective layer comprises:
  applying a light transmissive material on the organic layer in the display area and in the non-display area;
  disposing, on the light transmissive material, a mask comprising a light transmissive portion, a semi-light transmissive portion and a light blocking portion; and
  irradiating a light to the light transmissive material using the mask to expose the light transmissive material and form the column spacer and the protective layer,
  wherein the disposing the mask comprises disposing the semi-light transmissive portion of the mask above a portion of the light transmissive material which forms the protective layer.

12. The method as claimed in claim 11, wherein
 the irradiating of the light to the light transmissive material to form the column spacer and the protective layer exposes a surface of the organic layer, and
 in the non-display area, the protective layer is formed to have a smaller height than a height of the column spacer with respect to the exposed surface of the organic layer.

13. The method as claimed in claim 10, wherein the forming of the pixel of the display area comprises:
 forming a gate electrode at the display area;
 forming a semiconductor layer to be on and insulated from the gate electrode;
 forming a source electrode and a drain electrode spaced apart from each other, on the semiconductor layer; and
 forming a pixel electrode connected to the drain electrode,
 wherein the forming of the gate electrode, the source electrode and the drain electrode of the pixel at the display area is performed in a same process as a process in which the gate driver is formed at the non-display area.

14. The method as claimed in claim 13, wherein the forming of the pixel electrode in the display area is performed in a same process as a process in which the connection portion is formed in the non-display area.

15. The method as claimed in claim 11, wherein the forming of the protective layer in the non-display area disposes the protective layer on the connection portion, such protective layer extending further than outer edges of the connection portion.

16. The method as claimed in claim 15, wherein the irradiating of the light to the light transmissive material to form the column spacer and the protective layer exposes a surface of the organic layer in the non-display area, and
 such protective layer extending further than the outer edges of the connection portion in the non-display area contacts the exposed surface of the organic layer.

17. A display substrate of a display device comprising:
 a display area at which an image is displayed, and a non-display area at which the image is not displayed;
 a pixel provided in plurality arranged in the display area; and
 in the non-display area:
  a gate driver comprising a gate wiring and a data wiring;
  an organic layer on the gate wiring and the data wiring;
  a connection portion commonly connected to the gate wiring and the data wiring at contact holes respectively exposing the gate wiring and the data wiring; and
  a protective layer on the connection portion,
  wherein in a top plan view, the protective layer completely covers the connection portion to have a same shape as a shape of the connection portion.

* * * * *